UNITED STATES PATENT OFFICE.

HARRY S. THATCHER, OF LOS ANGELES, CALIFORNIA, ASSIGNOR TO CELITE PRODUCTS COMPANY, OF LOS ANGELES, CALIFORNIA, A CORPORATION OF CALIFORNIA.

PLASTER OR CEMENT COMPOSITION AND METHOD OF MAKING THE SAME.

1,251,841. Specification of Letters Patent. Patented Jan. 1, 1918.

No Drawing. Application filed June 17, 1916. Serial No. 104,166.

*To all whom it may concern:*

Be it known that I, HARRY S. THATCHER, a citizen of the United States, residing at Los Angeles, in the county of Los Angeles and State of California, have invented a new and useful Plaster or Cement Composition and Methods of Making the Same, of which the following is a specification.

This invention relates to a plaster or cement adapted for use as a covering for walls or for other purposes, and the main object of the invention is to provide a plaster or cement which is of great strength and is of comparatively light weight.

A further object of the invention is to provide a plaster which will, when mixed with water, form a composition of such plastic nature as to spread more readily than the ordinary plaster, and which will form when set, a smoother, finer grained surface than the ordinary plaster.

Another object of the invention is to provide a plaster which is adapted to make walls or other building constructions of unusually high heat resisting quality, as well as high insulating quality for heat and sound.

My improved plaster or cement contains, as essential constituents, calcined gypsum and a porous non-crystalline siliceous material having colloidal properties. The non-crystalline siliceous material I prefer to use is kieselguhr or infusorial earth, but other non-crystalline siliceous materials may be used, for example, tufa or like materials.

The kieselguhr used is preferably the air-dried product and the gypsum is used in calcined or burnt condition (plaster of Paris). The kieselguhr and calcined gypsum are mixed in such manner as to form an intimate mixture of finely divided gypsum and finely divided porous non-crystalline silica. For the purpose of making the material as light as possible it is desirable to incorporate a considerable percentage of kieselguhr with the plaster of Paris, or gypsum, but in mixing the gypsum with any large percentage of kieselguhr the product is liable to be weakened by the presence of loose kieselguhr, uncemented by gypsum. This is particularly the case when the kieselguhr and gypsum are mixed in dry condition, so as to form a dry powdered product, suitable for sale as such, and ready for use by simply mixing with water. In order to provide a dry plaster composition of uniform composition and adapted to form a firm, strong plaster when mixed with water and allowed to set, it is necessary to bring the kieselguhr into intimate contact and thorough mixture with the calcined gypsum and I accomplish this by intergrinding the kieselguhr and calcined gypsum in such a manner that a more intimate contact and a more thorough mixture of the said constituents is secured than is practicable by simply mixing them in the usual way.

Both the kieselguhr and the plaster of Paris may be ground to a moderate degree of fineness before they are interground, or they may be mixed in a coarsely crushed state and then interground, the grinding being preferably such as to reduce the mixture to a fineness of about 200 mesh or finer.

Any suitable proportions of kieselguhr and plaster of Paris may be used, for example, 20 to 30 per cent, by weight of kieselguhr and 80 to 70 per cent. by weight of plaster of Paris or calcined gypsum.

By intergrinding the non-crystalline silica with the calcined gypsum I am enabled to use a larger proportion of such non-crystalline silica than would be practicable by simply mixing these constituents, while retaining the full strength of the plaster or even increasing such strength. The product is also of especial advantage in plasters in that the colloidal silica acts as a retarder for the plaster, dispensing with the use of organic retarders. The presence of the kieselguhr in the comparatively large proportion stated, amounting to say two parts of kieselguhr by volume to one part of plaster, greatly increases the plasticity and smoothness of working of the plaster, owing to the colloidal property of the kieselguhr and the tendency to absorb and retain water. On account of the colloidal property of the kieselguhr and its intimate mixture with the calcined gypsum, a firmer bond is secured between these constituents and a stronger and more durable plaster or cement is produced, when the plaster is mixed with water. The comparatively large volume of kieselguhr which it is possible to introduce into the plaster by intergrinding renders the product much lighter than ordinary plaster, and due to the fineness to which the kieselguhr is ground it is possible to secure a much smoother finish than is possible with ordinary plaster. Another feature of this composition, which is of great importance in its application to frame buildings, is its great heat resisting or fire-proof quality, which is due to the heat resisting quality of kieselguhr or other non-crystalline siliceous material. The presence of the kieselguhr also causes the plaster or cement formed by this composition to be an efficient sound deadener.

The mixture of kieselguhr and calcined gypsum made as above described forms a dry powder which may be packed in sacks or barrels like ordinary plaster and sold in that condition for use together with water or with water and sand or other filler, in making plaster for walls or for other purposes, or for use as a cement.

In some cases, lime, either in the form of quicklime or of calcium hydrate, may be added to the mixture to reduce the acidity of the composition or for other purposes, and in such cases the lime is also preferably interground with the non-crystalline silica and calcined gypsum.

What I claim is:

1. A plaster or cement composition comprising finely divided porous non-crystalline silica and calcined gypsum, in a state of intimate contact and mixture.

2. A plaster or cement composition comprising porous non-crystalline silica having colloidal properties and calcined gypsum ground together to form an intimate mixture.

3. The process of making a plaster or cement composition which consists in intergrinding calcined gypsum with porous non-crystalline silica.

4. A plaster or cement composition comprising kieselguhr interground with calcined gypsum.

In testimony whereof I have hereunto set my hand, at Los Angeles, California, this 5th day of June, 1916.

HARRY S. THATCHER.

Witnesses:
   W. DIETERLE,
   G. F. GILLETTE.